(12) United States Patent
Kronström et al.

(10) Patent No.: US 11,971,182 B2
(45) Date of Patent: Apr. 30, 2024

(54) SAFETY SYSTEM, METHOD AND COMPUTER PROGRAM PRODUCT FOR EVACUATION OF CONTAMINATED AIR AND PREVENTION OF IGNITION IN AN AIR HANDLING SYSTEM

(71) Applicant: Fläktgroup Sweden AB, Jönköping (SE)

(72) Inventors: Urban Kronström, Tranås (SE); Dusan Stamenkovic, Jönköping (SE)

(73) Assignee: FLÄKTGROUP SWEDEN AB, Jönköping (SE)

( * ) Notice: Subject to any disclaimer, the term of this patent is extended or adjusted under 35 U.S.C. 154(b) by 698 days.

(21) Appl. No.: 17/254,594

(22) PCT Filed: Jun. 7, 2019

(86) PCT No.: PCT/SE2019/050529
§ 371 (c)(1),
(2) Date: Dec. 21, 2020

(87) PCT Pub. No.: WO2019/245428
PCT Pub. Date: Dec. 26, 2019

(65) Prior Publication Data
US 2021/0123624 A1  Apr. 29, 2021

(30) Foreign Application Priority Data
Jun. 22, 2018  (SE) .................... 1850780-6

(51) Int. Cl.
*F24F 11/33* (2018.01)
*F24F 11/36* (2018.01)
(Continued)

(52) U.S. Cl.
CPC ............ *F24F 11/33* (2018.01); *F24F 11/36* (2018.01); *F24F 11/49* (2018.01); *F24F 11/89* (2018.01);
(Continued)

(58) Field of Classification Search
CPC .. F24F 11/33; F24F 11/36; F24F 11/49; F24F 11/89; F24F 49/005; F24F 2110/66
See application file for complete search history.

(56) References Cited

U.S. PATENT DOCUMENTS 6,102,793 A * 8/2000 Hansen ................ F24F 11/0001
454/342
2013/0174592 A1 7/2013 Yamashita et al.
(Continued)

FOREIGN PATENT DOCUMENTS

DE  102009029392 A1  3/2011
DE  202016103305 U1  7/2016
(Continued)

OTHER PUBLICATIONS

JP-2003287343-A Translation (Year: 2003).*
(Continued)

*Primary Examiner* — David J Teitelbaum
(74) *Attorney, Agent, or Firm* — Haukaas Fortius PLLC; Michael Haukaas; Paul K. Judd

(57) ABSTRACT

A safety system (1) for evacuation of contaminated air and prevention of ignition in an air handling system (2). The air handling system (2) comprises a compressor enclosure (3). The safety system (1) is connectable to a power supply (4) and comprises an evacuation unit (5) connected to the compressor enclosure (3) for evacuation of contaminated air from the compressor enclosure (3).

16 Claims, 9 Drawing Sheets

(51) Int. Cl.
    *F24F 11/49*    (2018.01)
    *F24F 11/89*    (2018.01)
    *F24F 110/66*   (2018.01)
    *F25B 49/00*    (2006.01)

(52) U.S. Cl.
    CPC ......... *F25B 49/005* (2013.01); *F24F 2110/66* (2018.01)

(56) References Cited

U.S. PATENT DOCUMENTS

| | | | |
|---|---|---|---|
| 2018/0119977 A1 | | 5/2018 | Goel et al. |
| 2018/0231260 A1* | | 8/2018 | Wilson ................ F24D 19/1096 |
| 2020/0333021 A1* | | 10/2020 | Martinez Galvan ...... F24F 1/16 |

FOREIGN PATENT DOCUMENTS

| | | | | |
|---|---|---|---|---|
| JP | H1130462 A | | 2/1999 | |
| JP | 2002098393 A | * | 4/2002 | .......... F24F 11/0086 |
| JP | 2003287343 A | * | 10/2003 | |
| JP | 2007127388 A | | 5/2007 | |
| JP | 2015215111 A | | 12/2015 | |
| WO | 2017175300 A1 | | 10/2017 | |

OTHER PUBLICATIONS

JP-2002098393-A Translation (Year: 2002).*
International Search Report and Written Opinion of the ISA/SE in PCT/SE2019/050529, dated Sep. 11, 2019; 12pgs.

* cited by examiner

SAFETY SYSTEM, METHOD AND COMPUTER PROGRAM PRODUCT FOR EVACUATION OF CONTAMINATED AIR AND PREVENTION OF IGNITION IN AN AIR HANDLING SYSTEM

RELATED APPLICATIONS

This application is a national stage application filed under 35 U.S.C. § 371 of International Application No. PCT/SE2019/050529, filed Jun. 7, 2019, which claims the benefit of Swedish Patent Application No. 1850780-6 filed Jun. 22, 2018, which applications are incorporated herein by reference in their entirety.

TECHNICAL FIELD

The present invention relates to a safety system for evacuation of contaminated air and prevention of ignition in an air handling system.

BACKGROUND

Stricter environmental regulations regarding pollutants which have an effect on global warming will strongly impact the air handling systems of tomorrow. Taking into consideration the Global Warming Potential (GWP) of the refrigerant, where the refrigerant R410A often is used, is a very important area for improvement. One of the regulations of great importance, the EU regulation No 517/2014 of 16 Apr. 2014 on fluorinated greenhouse gases also known as the EU F-gas regulation, includes a phase down of refrigerants with high GWP values (CO2 equivalents). The objective of the F-gas regulation is to protect the environment by reducing emissions of fluorinated greenhouse gases. All coming generations of air handling systems with an integrated refrigerant system or for heating/cooling of air which is to be sold within the European Union must take into account the phase down schedule in 517/2014.

One solution of meeting the regulation is to use the R32 refrigerant instead of the R410A. This refrigerant is indeed suitable for cooling/heating applications comprising speed-controlled compressors. The GWP for R32 is 675, which is much less than the 2088 GWP for R410A. Further to this, the Coefficient of Performance (COP) of R32 is superior to many other refrigerants. The COP of R32 is for instance 5-10% higher than the COP of the R410A refrigerant. The R32 also provides the possibility to manufacture relatively compact refrigeration systems. It has a 5% higher volumetric cooling capacity compared to the R410A refrigerant.

R32 is a rather well-known refrigerant. As a component of R410A it is used in many residential refrigeration systems, but as a pure refrigerant it has not been used until recently. However, R32 is mildly flammable and forms poisonous hydrogen fluoride during combustion. R32 (Difluoromethane, HFC32, Methylene difluoride) is a single component refrigerant. In mixture with R125, the R32 refrigerant has been used to replace the ozone depleting R22 in various small air conditioning systems and heat pumps. The R125 has been used as a fire suspension agent in order to mitigate the flammability of R32. The 50/50% mixture of R32 with R125 is known as R410A and previously become a popular refrigerant.

According to EU regulations, R32 is classified as an extremely flammable gas, category 1 flammable, as it has greater than 12% flammability range by volume. However, contrary to this EU definition, R32 belongs to the mildly flammable A2L class by ASHRAE Standard 34 as it has low burning velocity.

If flammable refrigerant, such as for instance R32, would leak into the air handling system and in particular into the air flow stream inside the air handling system, there would be a risk that the refrigerant could ignite, due to various sources of ignition. Furthermore, when an air flow stream including leaked refrigerant exits the air handling system and enters the premises to be cooled/heated, there would be a risk that the refrigerant could ignite in proximity to human beings.

It is therefore desirable to accomplish an air handling system that reduces the risk of ignition of refrigerant and subsequently an explosion and/or a fire due to this.

SUMMARY OF INVENTION

An objective of the present invention is thus to accomplish an air handling system that reduces the risk of leaking refrigerants into the air flow stream in the air handling system, or that reduces the amount of leaking refrigerant if such a leakage occurs. Furthermore, one objective of the present invention is to find a technical solution which reduces the risk of ignition, if a leakage of refrigerant has occurred or is about to occur.

According to one aspect, the invention concerns a safety system for evacuation of contaminated air and prevention of ignition in an air handling system. The air handling system comprises a compressor enclosure. The safety system is connectable to a power supply and comprises an evacuation unit connected to the compressor enclosure for evacuation of contaminated air from the compressor enclosure.

An advantage of the solution, is that contaminated air from the compressor enclosure could be evacuated so that the contaminated air does not enter the air treatment area of the air handling unit. Furthermore, contaminated air from the compressor enclosure could be evacuated so that the contaminated air does not ignite due to any electrical component present in the compressor enclosure.

According to an embodiment of the invention, the evacuation unit may comprise a duct unit and an extraction unit.

An advantage of the solution, is that contaminated air from the compressor enclosure could be even more efficiently evacuated so that the contaminated air does not enter the air treatment area of the air handling unit. Furthermore, contaminated air from the compressor enclosure could be even more efficiently evacuated so that the contaminated air does not ignite due to any electrical component present in the compressor enclosure.

According to an embodiment of the invention, the system may comprise an air contamination sensor positioned in the compressor enclosure for collection of air contamination data, and an air flow sensor arranged in or in proximity to the evacuation unit for collection of air flow data.

An advantage of the solution, is that the air contamination sensor could collect data with regards to potentially contaminated air in the compressor enclosure. Furthermore, the air flow sensor could collect data with regards to the degree of air flow in the evacuation unit. The lower the air flow, the greater risk for a potential leaking refrigerant to accumulate and result in a flammable gas mixture in the compressor enclosure.

According to an embodiment of the invention, the power supply may be divided into a safety system power supply and an air handling power supply. The safety system power supply provides power to the extraction unit, the air contamination sensor and the air flow sensor. The air handling power supply provides power to the air handling system. The safety system power supply and the air handling power supply are operating independently of each other.

An advantage of the solution, by having the safety system power supply and the air handling power supply operating independently of each other, is that the operating mode of the air handling power supply does not impact the operating mode of the safety system power supply. This implies that contaminated air from the compressor enclosure could be evacuated by means of the safety system power supply independently from the operating mode of the air handling power supply, so that the contaminated air does not enter the air treatment area of the air handling unit. Furthermore, contaminated air from the compressor enclosure could be evacuated by means of the safety system power supply independently from the operating mode of the air handling power supply, so that the contaminated air does not ignite due to any electrical component present in the compressor enclosure.

According to an embodiment of the invention, the safety system power supply is continuously operating irrespective of the air handling power supply being active or inactive.

An advantage of the solution, by having the safety system power supply continuously operating irrespective of the air handling power supply being active or inactive, is that a potential inactivity of the air handling power supply does not imply that the safety system power supply turns inactive. This further implies that contaminated air from the compressor enclosure could be evacuated by means of the safety system power supply irrespective of the air handling power supply being active or inactive so that the contaminated air does not enter the air treatment area of the air handling unit. Furthermore, contaminated air from the compressor enclosure could be evacuated by means of the safety system power supply irrespective of the air handling power supply being active or inactive, so that the contaminated air does not ignite due to any electrical component present in the compressor enclosure.

According to an embodiment of the invention, the extraction unit is a fan.

An advantage of the solution, is that a fan is standard evacuation component resulting in a robust and cost efficient technical solution.

According to an embodiment of the invention, the system may comprise an air contamination sensor positioned in the compressor enclosure for collection of air contamination data.

An advantage of the solution, is that the air contamination sensor could collect data with regards to potentially contaminated air in the compressor enclosure.

According to an embodiment of the invention, the extraction unit may be a first and a second fan connected in series or in parallel.

An advantage of the solution, is that a fan is standard evacuation component resulting in a robust and cost efficient technical solution. Furthermore, having two fans connected in series would increase the robustness of the system. This further implies that contaminated air from the compressor enclosure could be evacuated by means of the second fan irrespective of the first fan being active or inactive so that the contaminated air does not enter the air treatment area of the air handling unit. Furthermore, contaminated air from the compressor enclosure could be evacuated by means of the second fan irrespective of the first fan being active or inactive, so that the contaminated air does not ignite due to any electrical component present in the compressor enclosure.

According to an embodiment of the invention, at least one of the first fan and the second fan may be connected to an uninterruptible power supply for providing power in case of a power cut.

An advantage of the solution, is that it would increase the robustness of the system. This further implies that contaminated air from the compressor enclosure could be evacuated by means of at least a fan being active supplied by power from an uninterruptible power supply if there is a power cut, so that the contaminated air does not enter the air treatment area of the air handling unit. Furthermore, contaminated air from the compressor enclosure could be evacuated by means of at least a fan being active supplied by power from an uninterruptible power supply if there is a power cut, so that the contaminated air does not ignite due to any electrical component present in the compressor enclosure.

According to an embodiment of the invention, a duct inlet of the duct unit may be arranged in a bottom part of the compressor enclosure.

An advantage of the solution, is that contaminated air from the compressor enclosure could be even more efficiently evacuated so that the contaminated air does not enter the air treatment area of the air handling unit. Furthermore, contaminated air from the compressor enclosure could be even more efficiently evacuated so that the contaminated air does not ignite due to any electrical component present in the compressor enclosure. The underlying reason to the above, is that contaminated air most often will sink to the bottom of the compressor enclosure, and if the duct inlet of the duct unit is arranged in a bottom part of the compressor enclosure the contaminated air will more efficiently be evacuated from the compressor enclosure.

According to an embodiment of the invention, an air supply inlet for supply of air may be arranged in an upper part of the compressor enclosure.

An advantage of the solution, is that contaminated air from the compressor enclosure could be even more efficiently evacuated so that the contaminated air does not enter the air treatment area of the air handling unit. Furthermore, contaminated air from the compressor enclosure could be even more efficiently evacuated so that the contaminated air does not ignite due to any electrical component present in the compressor enclosure. The underlying reason to the above, is that contaminated air most often will sink to the bottom of the compressor enclosure, and if the air supply inlet for supply of air is arranged in an upper part of the compressor enclosure there will be a relatively good air flow from the upper part to the bottom part of the compressor enclosure improving the evacuation of contaminated air.

According to an embodiment of the invention, the contaminated air may contain flammable gas.

An advantage of the solution, is that flammable gas from the compressor enclosure could be evacuated so that the flammable gas does not enter the air treatment area of the air handling unit. Furthermore, flammable gas from the compressor enclosure could be evacuated so that the flammable gas does not ignite due to any electrical component present in the compressor enclosure.

According to an embodiment of the invention, the flammable gas may be of the type R32 or any other A2L classified refrigerant.

According to an embodiment of the invention, the flammable gas may be of the type propane or any other A3 classified refrigerant.

According to a second aspect, the invention concerns a method for controlling a safety system for evacuation of contaminated air and prevention of ignition in an air handling system comprising the following steps. Providing power to the air handling system and an extraction unit by means of a power supply. Providing power to the extraction unit by means of an uninterruptible power supply as a response to if the power supply stops providing power.

An advantage of the solution, is that it would increase the robustness of the system. This further implies that contaminated air from the compressor enclosure could be evacuated by means of the extraction unit being active supplied by power from an uninterruptible power supply if there is a power cut, so that the contaminated air does not enter the air treatment area of the air handling unit. Furthermore, contaminated air from the compressor enclosure could be evacuated by means of the extraction unit supplied by power from an uninterruptible power supply if there is a power cut, so that the contaminated air does not ignite due to any electrical component present in the compressor enclosure.

According to a preferred embodiment, the extraction unit may be a fan.

An advantage of the solution, is that a fan is standard evacuation component resulting in a robust and cost efficient technical solution.

According to a preferred embodiment, the extraction unit may be a first and a second fan connected in series or in parallel.

An advantage of the solution, is that a fan is standard evacuation component resulting in a robust and cost efficient technical solution. Furthermore, having two fans connected in series would increase the robustness of the system. This further implies that contaminated air from the compressor enclosure could be evacuated by means of the second fan irrespective of the first fan being active or inactive so that the contaminated air does not enter the air treatment area of the air handling unit. Furthermore, contaminated air from the compressor enclosure could be evacuated by means of the second fan irrespective of the first fan being active or inactive, so that the contaminated air does not ignite due to any electrical component present in the compressor enclosure.

According to a preferred embodiment, the method further comprises the following step. Providing power to the first fan by means of an uninterruptible power supply as a response to if the power supply stops providing power.

An advantage of the solution, is that it would increase the robustness of the system. This further implies that contaminated air from the compressor enclosure could be evacuated by means of at least a fan being active supplied by power from an uninterruptible power supply if there is a power cut, so that the contaminated air does not enter the air treatment area of the air handling unit. Furthermore, contaminated air from the compressor enclosure could be evacuated by means of at least a fan being active supplied by power from an uninterruptible power supply if there is a power cut, so that the contaminated air does not ignite due to any electrical component present in the compressor enclosure.

According to a preferred embodiment, the method further comprises the following step. Providing power to the second fan by means of the uninterruptible power supply as a response to if the power supply stops providing power.

An advantage of the solution, is that it would increase the robustness of the system even further. This further implies that contaminated air from the compressor enclosure could be evacuated by means of the first and the second fan being active supplied by power from an uninterruptible power supply if there is a power cut, so that the contaminated air does not enter the air treatment area of the air handling unit. Furthermore, contaminated air from the compressor enclosure could be evacuated by means of the first and the second fan being active supplied by power from an uninterruptible power supply if there is a power cut, so that the contaminated air does not ignite due to any electrical component present in the compressor enclosure.

According to a preferred embodiment, the method further comprises the following steps. Providing power to an air contamination sensor by means of the power supply. Collecting air contamination data by means of the air contamination sensor. Comparing the collected air contamination data to a predefined air contamination threshold value. Transmitting an alarm to an operator as a response to if an air contamination data value of the collected air contamination data is greater than the predefined air contamination threshold value.

An advantage of the solution, is that an operator after having received an alarm could control the air handling unit for any potential leaking refrigerant in the compressor enclosure, and subsequently having the leaking component being replaced or repaired.

According to a third aspect, the invention concerns a method for controlling a safety system for evacuation of contaminated air and prevention of ignition in an air handling system which has been preceded by the following steps. Providing power to the air handling system by means of an air handling power supply. Providing power to an air flow sensor, an air contamination sensor and an extraction unit by means of a safety system power supply. The method for controlling a safety system comprises the following steps. Collecting air contamination data by means of an air contamination sensor. Comparing the collected air contamination data to a predefined air contamination threshold value. Shutting down the air handling power supply providing power to the air handling system as a response to if an air contamination data value of the collected air contamination data is greater than the predefined air contamination threshold value.

An advantage of the solution, is that contaminated air from the compressor enclosure would not ignite due to any active electrical component present in the compressor enclosure.

According to a preferred embodiment, the method further comprises the following steps. Collecting air flow data by means of an air flow sensor. Comparing the collected air flow data to a predefined air flow threshold value. Shutting down the air handling power supply providing power to the air handling system as a response to if an air flow data value of the collected air flow data is lower than the predefined air flow threshold value.

An advantage of the solution, is that contaminated air from the compressor enclosure would not ignite due to any active electrical component present in the compressor enclosure and powered by the air handling power supply. The underlying reason to shut down the air handling power supply providing power to the air handling system, is that if the amount of air flow in the evacuation unit is determined to not be enough, a potential leak of contaminated air could lead to an ignition in the compressor enclosure.

According to a preferred embodiment, the method has been preceded by the following step. Shutting down the air handling power supply providing power to the air handling system as a response to that an air flow data value of the collected air flow data has been lower than the predefined air flow threshold value. The method further comprises the following step. Restarting the air handling power supply providing power to the air handling system as a response to that an air flow data value of the collected air flow data is greater than the predefined air flow threshold value.

An advantage of the solution, is that contaminated air from the compressor enclosure would not ignite due to any active electrical component present in the compressor enclosure and powered by the air handling power supply when the air flow is determined to not be enough. The underlying reason to initially shut down the air handling power supply providing power to the air handling system, is that if the amount of air flow in the evacuation unit is not enough, a potential leak of contaminated air could lead to an ignition in the compressor enclosure. The underlying reason to restart the air handling system is to provide cooled/heated air once again.

According to a fourth aspect of the invention a computer readable medium storing a computer program product is accomplished.

A computer program product is provided comprising coded instructions to implement a method when the computer program product is executed in a processor provided in the system.

A computer readable medium storing a computer program product is provided.

The technology described is in particular suitable for integrated reversible heat pumps.

A3 and A2L are different safety group classifications of refrigerants according to the ANSI/ASHRAE Standard 34-2007. Designation and Safety Classification of Refrigerants.

Refrigerant is a term equivalent to the medium which circulates in a refrigerant circuit and which in heating mode picks up heat at a low temperature in the evaporator and subsequently releases the heat at a higher temperature and a higher pressure in the condenser. The refrigerant can take up and release more energy at the transition between different states (gas or liquid) than than only a change in temperatures.

For heating mode the direct DX coil in the exhaust air is the equivalent as the evaporator in the heat pump circuit. The very same direct DX coil constitutes the condenser in cooling mode.

The evacuation unit may also be used as ventilation to avoid high temperatures in the compressor enclosure.

If a leakage occurs in the refrigerant circuit, the air contamination sensor will detect the concentration of the refrigerant, for instance R32 in air less or equal to 25% of LFL and shut down the power to the air handling unit. Electrical power will then only be supplied to the evacuation unit and the sensor. With gas concentrations far below the LFL, an alarm will initially be transmitted informing an operator that a leakage is present.

Lower Flammable Limit (LFL) in kg/m3. LFL for R32 equals 0.306 kg/m3.

One fan would be enough to ventilate the compressor enclosure to avoid flammable concentrations, which for instance could be 25% under LFL.

The air handling system could be offered in two different options. The first option is a system with a compressor enclosure designed for indoor use. The second option is a system with a compressor enclosure designed for outdoor use. If the compressor enclose is placed outside there would be no need for installation of additional duct units. Additional duct units must only be installed if the machine room volume is not enough or if the machine room is not ventilated.

The collected air contamination data could instead be air quality data, where if the collected air quality data value is low enough this would imply that there is an air contamination present in the atmosphere and the system would thus react.

The evacuation unit could be arranged at an outlet of the duct unit, in the duct unit, or at an inlet of the duct unit. If the evacuation unit are two fans, each specific fan could individually be arranged at an outlet of the duct unit, in the duct unit, or at an inlet of the duct unit.

The contaminated air is by means of the evacuation unit evacuated to outside the air handling unit and outside any premises so that human beings will not be affected by the contaminated air. In case of the contaminated air being a flammable refrigerant, the risk of ignition of the refrigerant is greatly reduced by evacuating the refrigerant to outside the air handling unit and outside any premises.

In the compressor enclosure there are often a lot of different electric and electronic components present. Power to these components should be shut down if there is contaminated air present in the compressor enclosure.

The duct inlet of the duct unit could either be arranged in a bottom part of the compressor enclosure or connected to a bottom part of the compressor enclosure.

The air flow sensor which is arranged in or in proximity to the evacuation unit for collection of air flow data collects data with regards to the degree of air flow in the evacuation unit. In proximity means that the sensor is arranged in such a manner that the air flow in, to, or from the evacuation unit can be measured.

BRIEF DESCRIPTION OF DRAWINGS

The invention is now described, by way of example, with reference to the accompanying drawings, in which.

DESCRIPTION OF EMBODIMENTS

In the following, a detailed description of an air handling system for heating/cooling of air is provided.

FIGS. 1a, 2a, 3a, 4a, 5a and 6a shows a safety system 1 for evacuation of contaminated air and prevention of ignition in an air handling system 2 according to different embodiments of the invention.

Figure 1A:
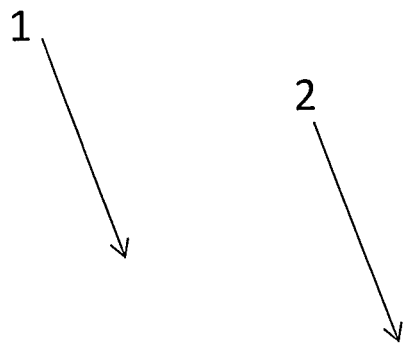
FIGS. 1a, 2a, 3a, 4a, 5a and 6a shows a safety system for evacuation of contaminated air and prevention of ignition in an air handling system, in a front view, according to an embodiment of the invention.
Figure 1B:
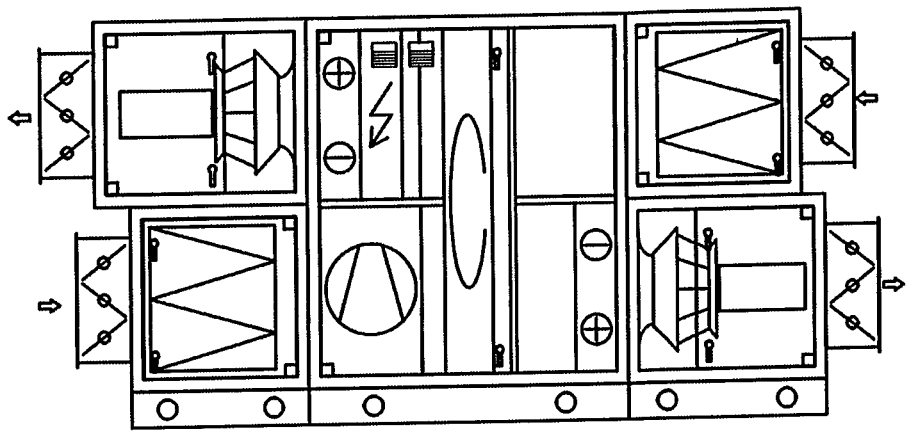
FIGS. 1b, 2b, 3b, 4b, 5b and 6b shows a safety system for evacuation of contaminated air and prevention of ignition in an air handling system, from above, according to an embodiment of the invention.
Figure 1B:
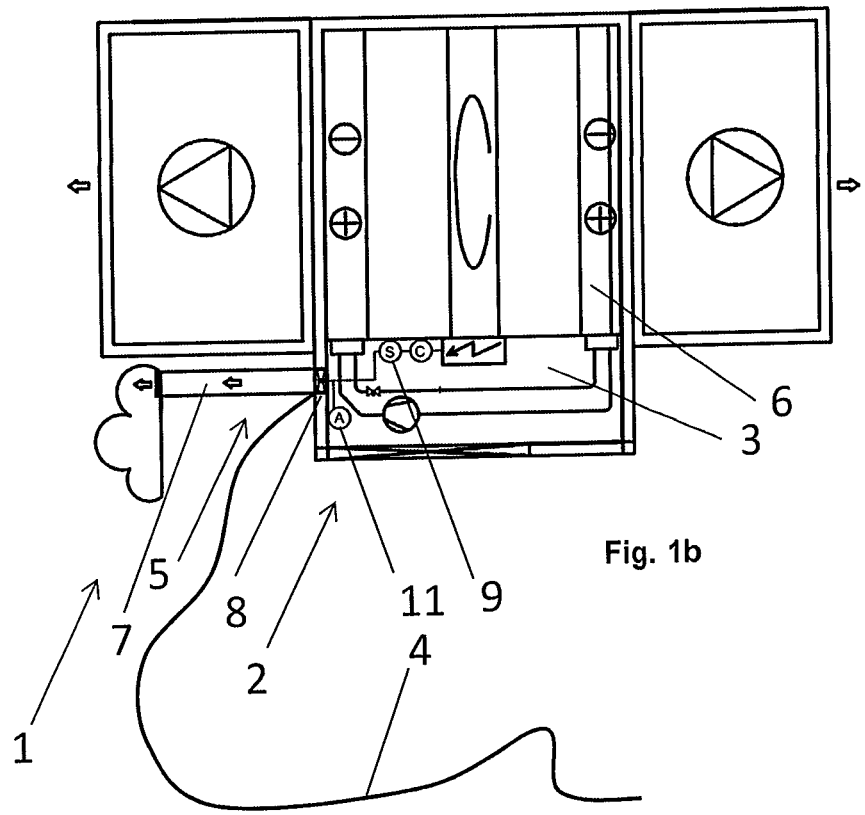
Figure 2A:
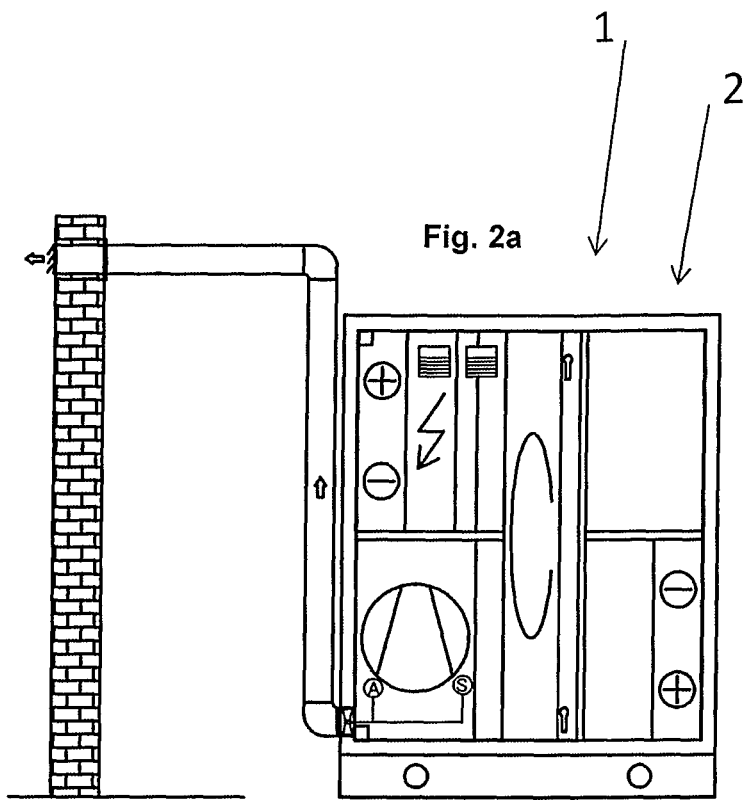
Figure 2B:
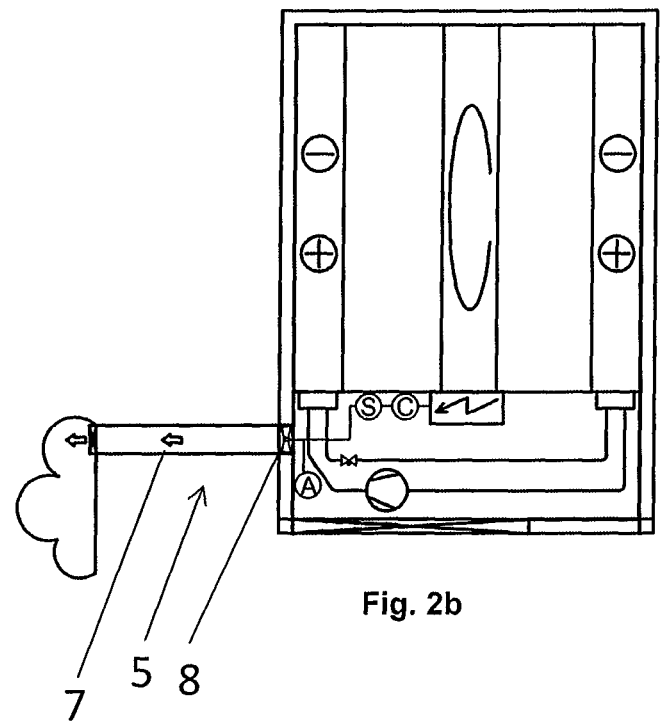

FIGS. 1b and 2b shows a safety system 1 for evacuation of contaminated air and prevention of ignition in an air handling system 2 according to an embodiment of the invention. The air handling system 2 made up of a compressor enclosure 3. The safety system 1 is connectable to a power supply 4 and comprises an evacuation unit 5 connected to the compressor enclosure 3 for evacuation of contaminated air from the compressor enclosure 3. The evacuation unit 5 comprises a duct unit 7 and an extraction unit 8. An air contamination sensor 9 is positioned in the compressor enclosure 3 for collection of air contamination data 10. An air flow sensor 11 is arranged in or in proximity to the evacuation unit 5 for collection of air flow data 12.

Figure 3A:
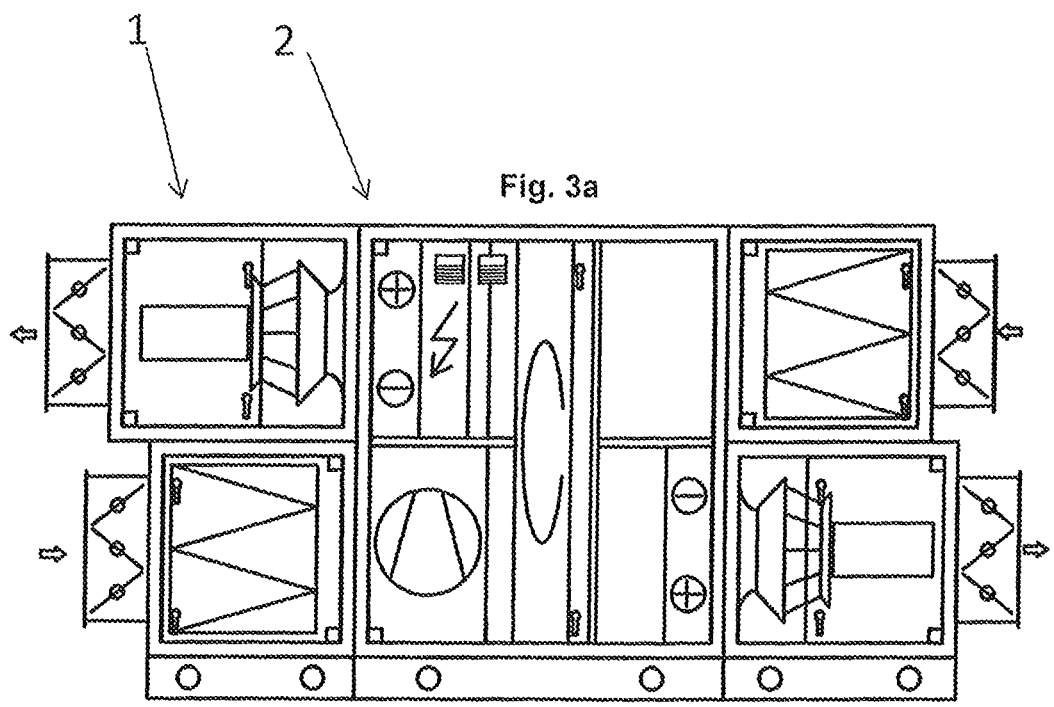
Figure 3B:
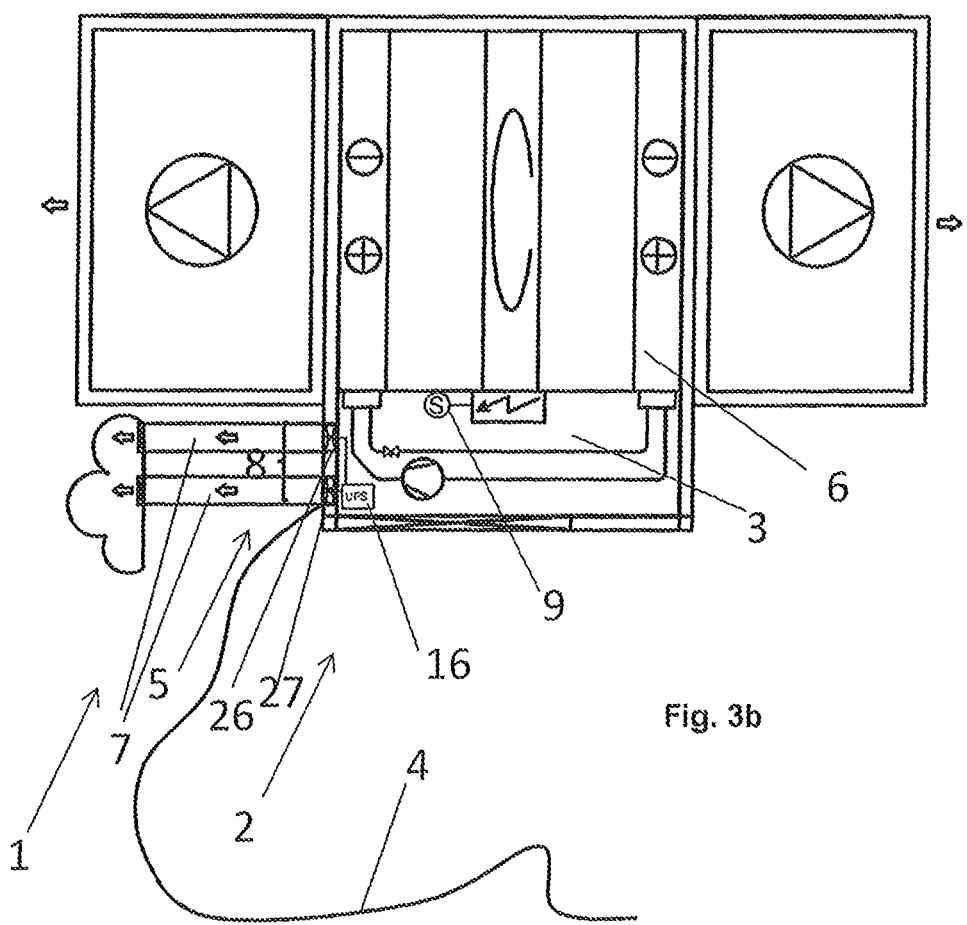
Figure 4A:
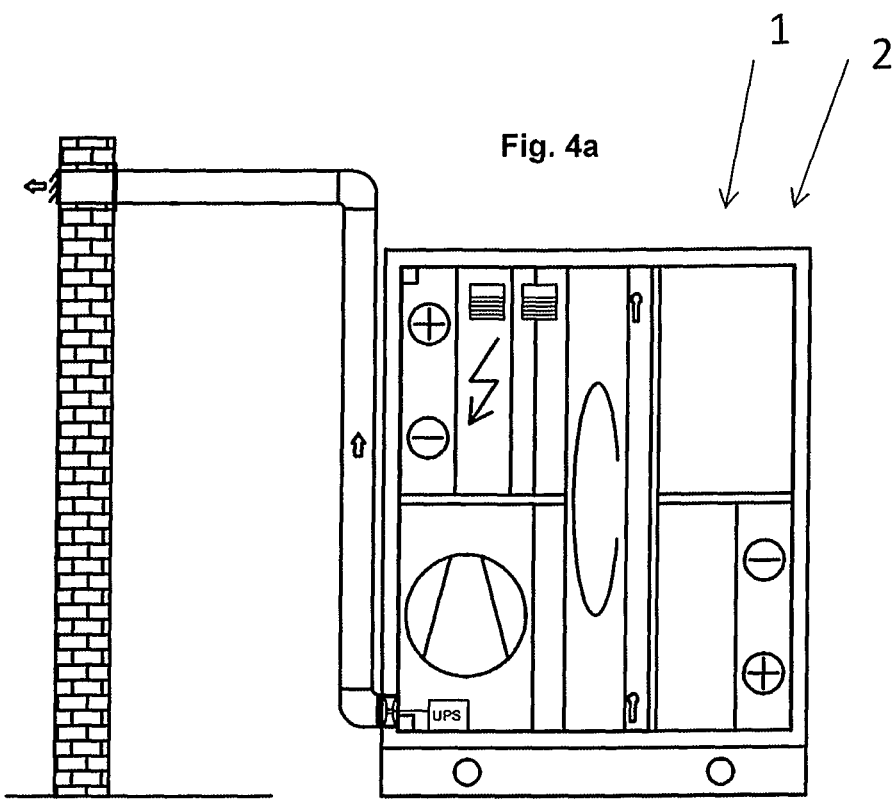
Figure 4B:
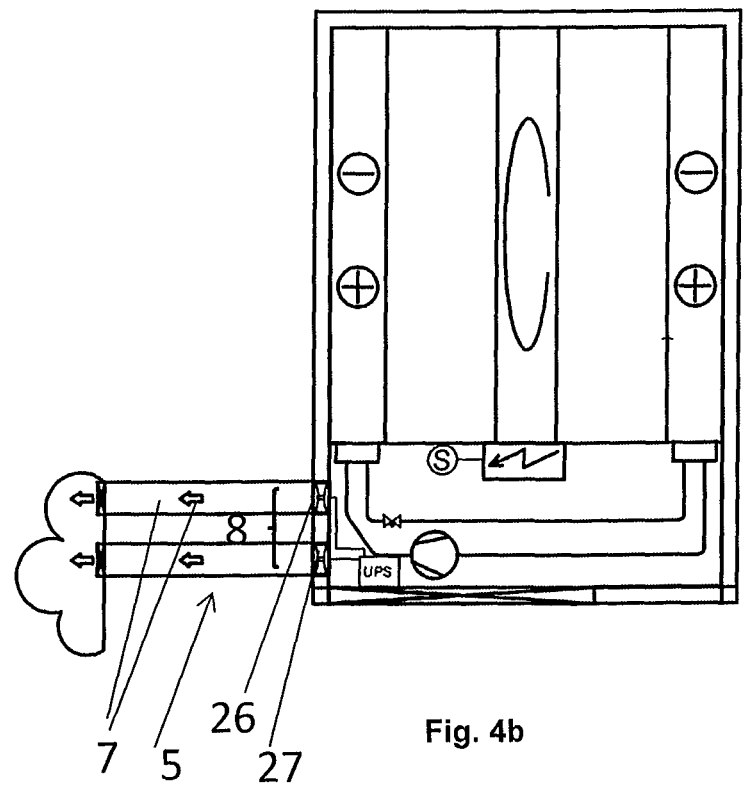

FIGS. 3b and 4b shows a safety system 1 for evacuation of contaminated air and prevention of ignition in an air handling system 2 according to an embodiment of the invention. The air handling system 2 made up of a compressor enclosure 3. The safety system 1 is connectable to a power supply 4 and comprises two evacuation units 5 connected in parallel to the compressor enclosure 3 for evacuation of contaminated air from the compressor enclosure 3. An evacuation unit 5 comprises a duct unit 7 and an extraction unit 8. The extraction unit 8 is a first 26 and a second fan 27 connected in parallel. At least one of the first fan 26 and the second fan 27 is connected to an uninterruptible power supply 16 for providing power in case of a power cut. An air contamination sensor 9 is positioned in the compressor enclosure 3 for collection of air contamination data 10.

Figure 5A:
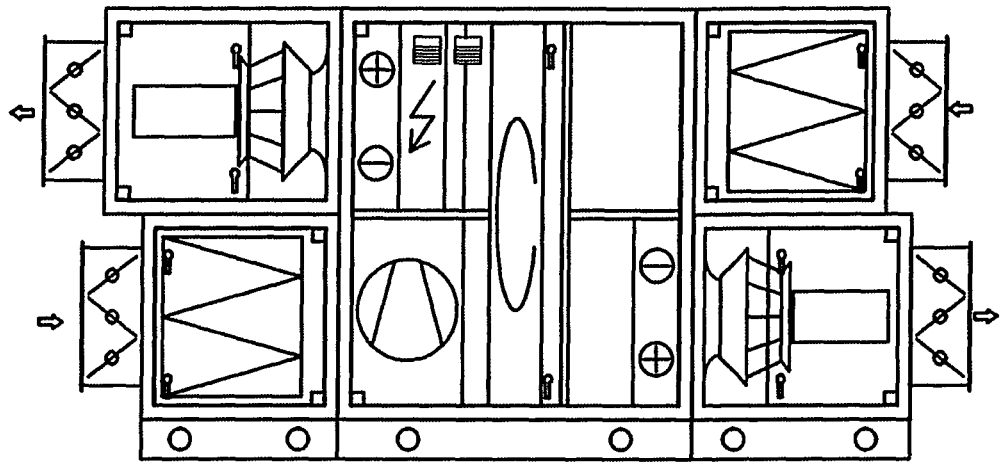
Figure 5B:
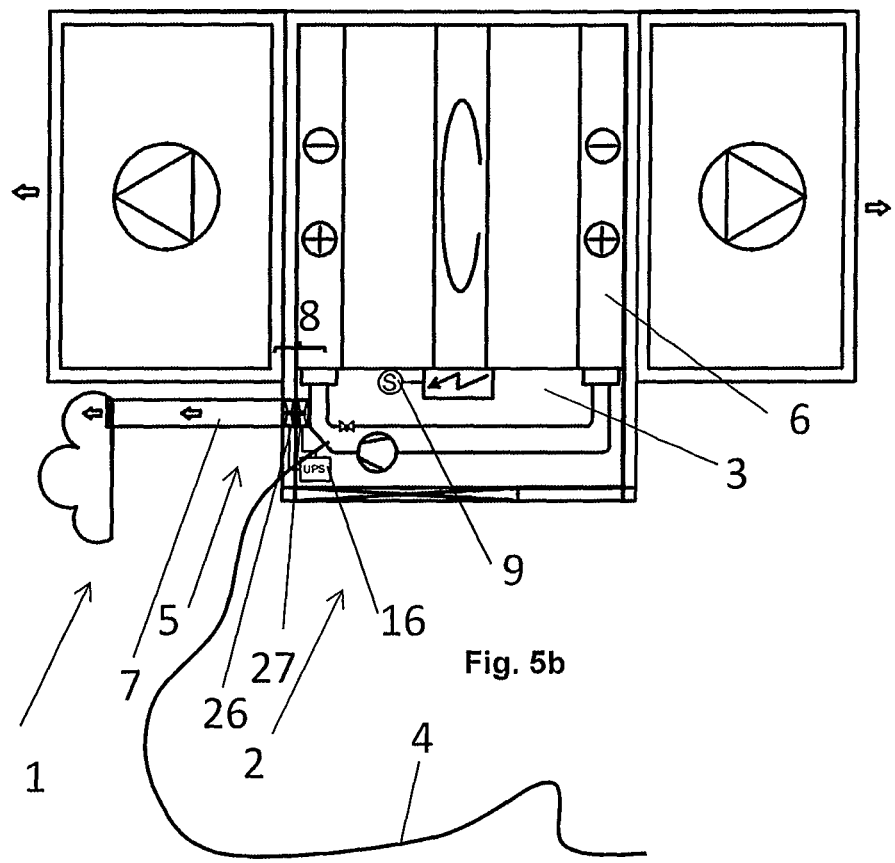
Figure 6A:
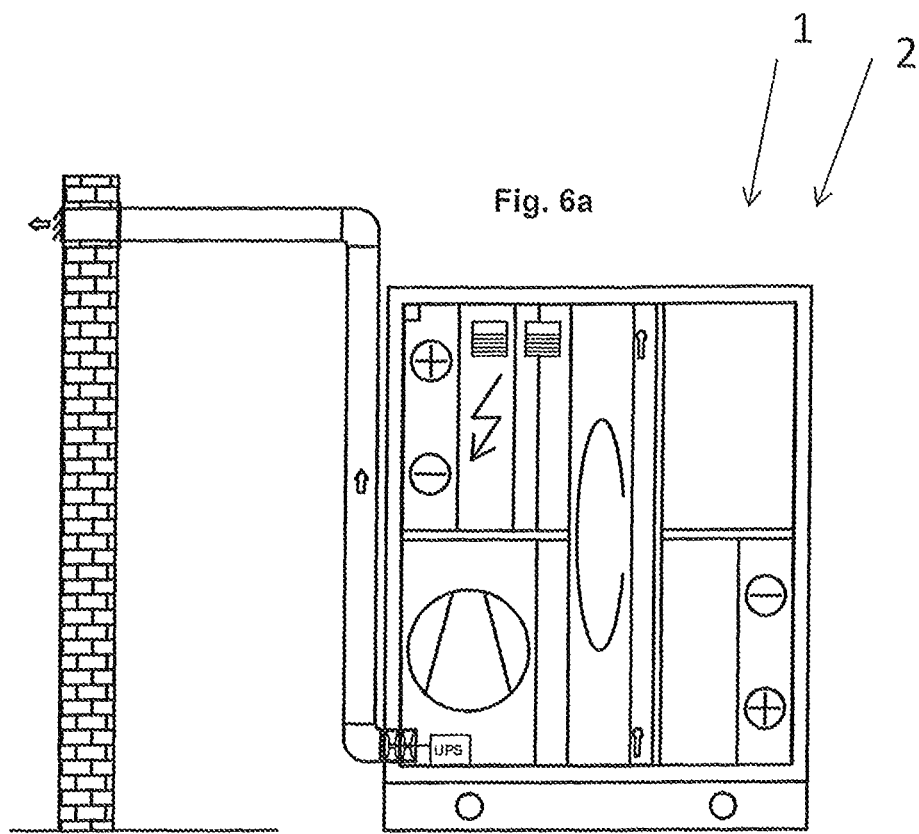
Figure 6B:
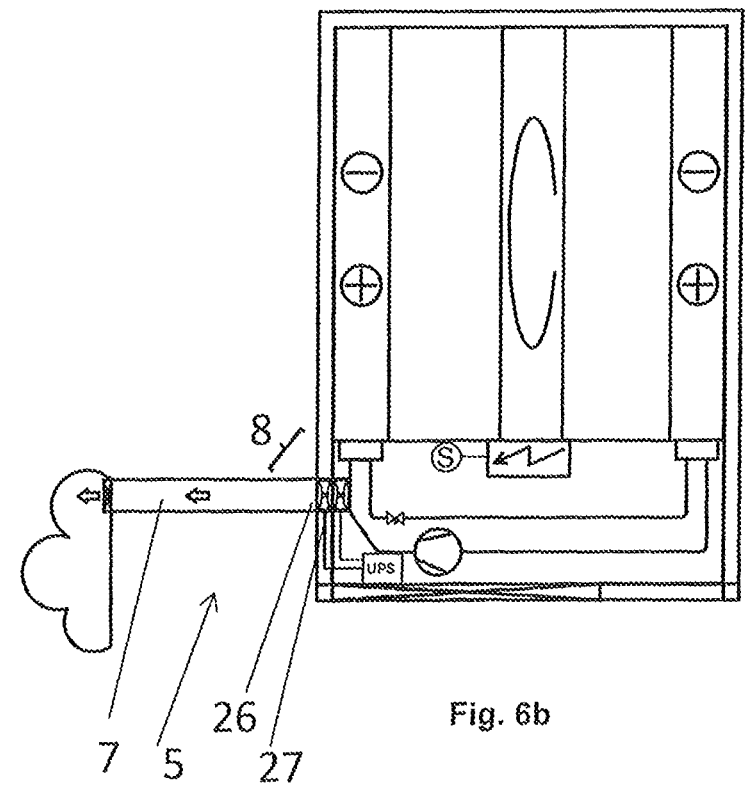
Figure 7:
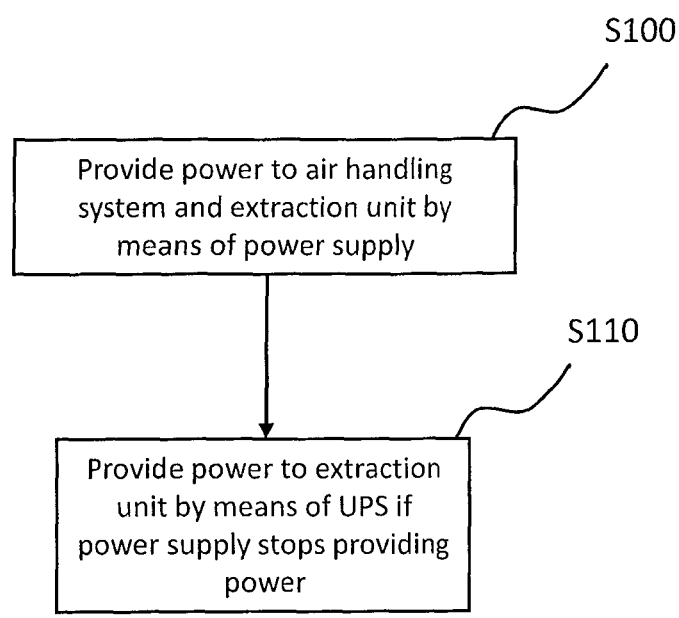
FIG. 7 shows a flow chart of a method according to an embodiment of the invention.
Figure 8:
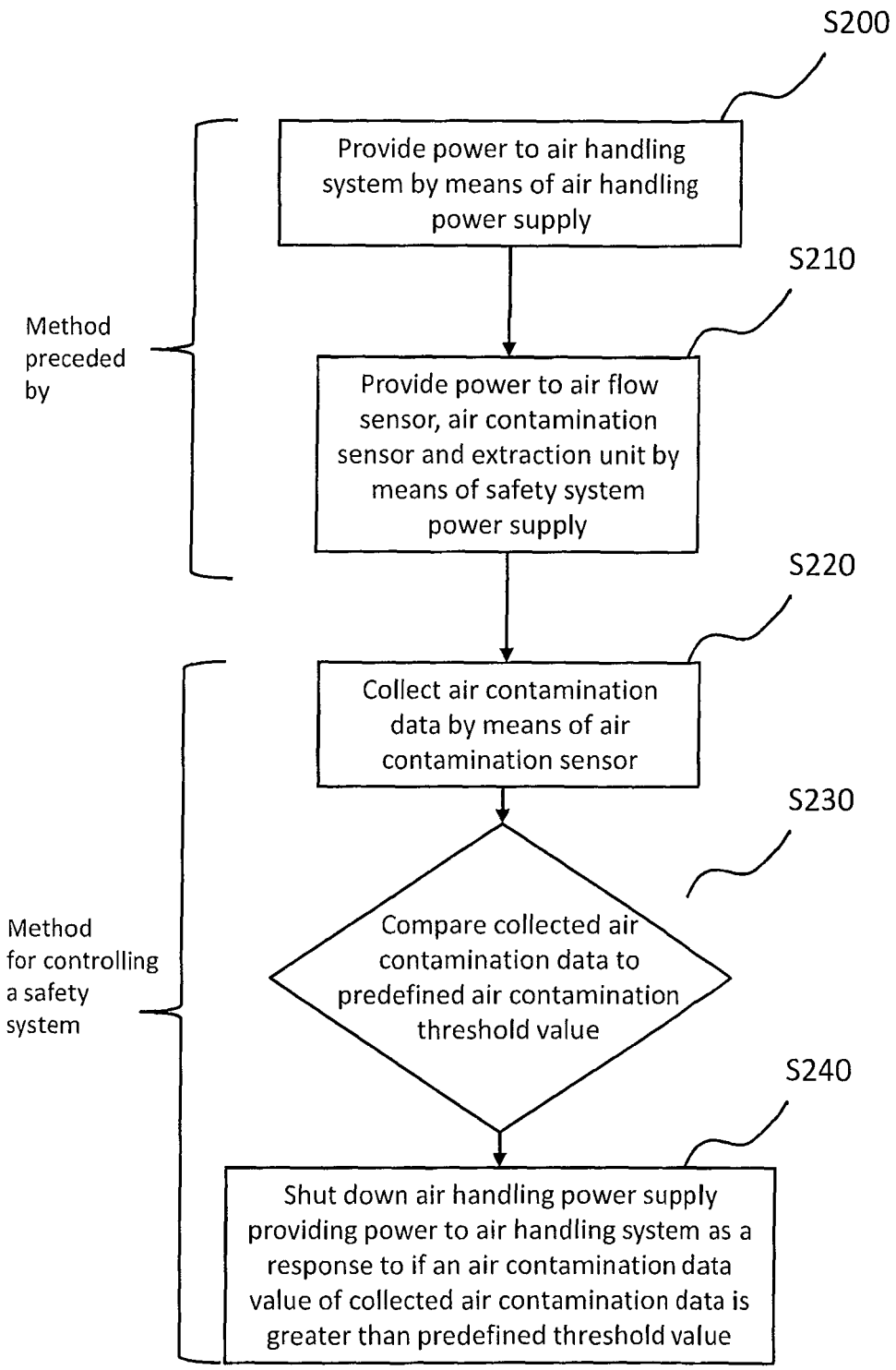
FIG. 8 shows a flow chart of a method according to an embodiment of the invention.

FIGS. 5b and 6b shows a safety system 1 for evacuation of contaminated air and prevention of ignition in an air handling system 2 according to an embodiment of the invention. The air handling system 2 made up of a compressor enclosure 3. The safety system 1 is connectable to a power supply 4 and comprises an evacuation unit 5 connected to the compressor enclosure 3 for evacuation of contaminated air from the compressor enclosure 3. The evacuation unit 5 comprises a duct unit 7 and an extraction unit 8. The extraction unit 8 is a first 26 and a second fan 27 connected in series. An air contamination sensor 9 is positioned in the compressor enclosure 3 for collection of air contamination data 10. At least one of the first fan 26 and the second fan 27 is connected to an uninterruptible power supply 16 for providing power in case of a power cut.

The air to be treated passes through the evaporator/condenser coil 6 in the air treatment space 3. The treated air is to be transferred to the premises where e.g. human beings are to be found. In the air treatment space 3 or in said premises there should be no leaking refrigerant 7.

In a step S100 power is provided to the air handling system 2 and an extraction unit 8 by means of a power supply 4. In a step S110 power is provided to the extraction unit 8 by means of an uninterruptible power supply 16 as a response to if the power supply 4 stops providing power.

The method for controlling a safety system 1 is preceded by the steps S200-S210. In a step S200 power is provided to the air handling system 2 by means of an air handling power supply 14. In a step S210 power is provided to an air flow sensor 11, an air contamination sensor 9 and an extraction unit 8 by means of a safety system power supply 13. The method for controlling a safety system 1 comprises the steps of S220-S240. In a step S220 air contamination data 15 is collected by means of an air contamination sensor 9. In a step S230 the collected air contamination data 15 is compared to a predefined air contamination threshold value 21. In a step S240 the air handling power supply 14 which is providing power to the air handling system 2 is shut down as a response to if an air contamination data value 22 of the collected air contamination data 15 is greater than the predefined air contamination threshold value 21.

Figure 9:
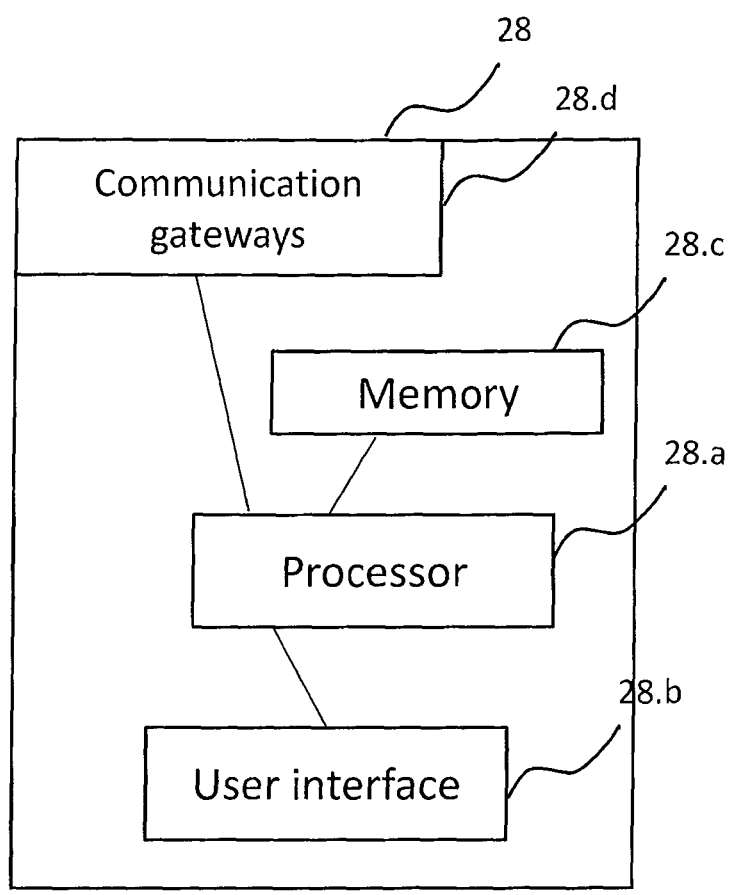
FIG. 9 shows a block diagram of a control system according to an embodiment of the invention.

FIG. 9 shows a block diagram of a control system 28, comprising a processor 28.a, a user interface 28.b, a memory 28.c, and communication gateways 28.d. Through the communication gateways the control system can receive and send signals from/to other parts of the system. Through the user interface the control system can communicate with the user, through for instance a viewing screen, keyboard, mouse, printer, loud speaker, microphone or other type of peripheral. The computer program product can be stored in the memory, and be executed in the processor.

LIST OF COMPONENTS

1=safety system
2=air handling system
3=compressor enclosure
4=power supply
5=evacuation unit
6=contaminated air
7=duct unit
8=extraction unit
9=air contamination sensor
10=air contamination data
11=air flow sensor
12=air flow data
13=safety system power supply
14=air handling power supply
15=air contamination data
16=uninterruptible power supply
17=a duct inlet
18=bottom part of the compressor enclosure
19=an air supply inlet
20=upper part of the compressor enclosure
21=predefined air contamination threshold value
22=air contamination data value
23=predefined air flow threshold value
24=air flow data value
25=control unit
26=first fan
27=second fan
28=control system
28.a=processor
28.b=user interface
28.c=memory
28.d=communication gateways

The invention claimed is:

1. An air handling system comprising a safety system for evacuation of contaminated air and prevention of ignition in the air handling system, wherein the air handling system comprises a compressor enclosure and a power supply, wherein the safety system comprises an evacuation unit connected to the compressor enclosure for evacuation of contaminated air from the compressor enclosure, and wherein said safety system comprises an air contamination sensor positioned in the compressor enclosure for collection of air contamination data and an air flow sensor arranged in or in proximity to the evacuation unit for collection of air flow data, wherein the evacuation unit comprises a duct and an extraction unit, and wherein the power supply is divided into a safety system power supply and an air handling power supply, wherein the safety system power supply provides power to the extraction unit, the air contamination sensor and the air flow sensor, and wherein the air handling power supply provides power to the air handling system, wherein the safety system power supply and the air handling power supply are operating independently of each other.

2. The air handling system according to claim 1, wherein the safety system power supply is continuously operating irrespective of the air handling power supply being active or inactive.

3. The air handling system according to claim 1, wherein the extraction unit is a fan.

4. The air handling system according to claim 1, wherein the extraction unit is a first and a second fan connected in series or in parallel.

5. The air handling system according to claim 4, wherein at least one of the first fan and the second fan is connected to an uninterruptible power supply for providing power in case of a power cut.

6. The air handling system according to claim 1, wherein a duct inlet of the duct unit is arranged in a bottom part of the compressor enclosure.

7. The air handling system according to claim 1, wherein an air supply inlet for supply of air is arranged in an upper part of the compressor enclosure.

8. The air handling system according to claim 1, wherein the contaminated air contains flammable gas.

9. The air handling system according to claim 8, wherein the flammable gas is R32 or any other A2L classified refrigerant, or the flammable gas is propane or any other A3 classified refrigerant.

10. A method for controlling a safety system for evacuation of contaminated air and prevention of ignition in an air handling system, wherein the air handling system comprises a power supply, wherein the power supply is divided into a safety system power supply and an air handling power supply, wherein power is provided to the air handling system by means of the air handling power supply, wherein power is provided to an air flow sensor, an air contamination sensor and an extraction unit by means of a safety system power supply, wherein the method comprises the steps of:
- collecting air contamination data by means of the air contamination sensor;
- comparing the collected air contamination data to a predefined air contamination threshold value;
- shutting down the air handling power supply providing power to the air handling system as a response to if an air contamination data value of the collected air contamination data is greater than the predefined air contamination threshold value, wherein the evacuation unit comprises a duct and an extraction unit, and wherein the power supply is divided into a safety system power supply and an air handling power supply, wherein the safety system power supply provides power to the extraction unit, the air contamination sensor and the air flow sensor, and wherein the air handling power supply provides power to the air handling system, wherein the safety system power supply and the air handling power supply are operating independently of each other.

11. The method according to claim 10, wherein the method further comprises the step of:
- providing power to the extraction unit by means of an uninterruptible power supply as a response to if the power supply stops providing power.

12. The method according to claim 11, wherein the extraction unit is a fan.

13. The method according to claim 11, wherein the extraction unit is a first and a second fan connected in series or in parallel.

14. The method according to claim 10, wherein the method further comprises the steps of:
- providing power to the air contamination sensor by means of the power supply;
- collecting air contamination data by means of the air contamination sensor;
- comparing the collected air contamination data to a predefined air contamination threshold value;
- transmitting an alarm to an operator as a response to if an air contamination data value of the collected air contamination data is greater than the predefined air contamination threshold value.

15. A computer program product comprising coded instructions to implement a method according to claim 10 when the computer program product is executed in a processor provided in the system according to claim 10.

16. A computer readable medium storing a computer program product according to claim 15.

* * * * *